United States Patent
Xu et al.

(10) Patent No.: US 10,860,481 B2
(45) Date of Patent: Dec. 8, 2020

(54) DATA RECOVERY METHOD, DATA RECOVERY SYSTEM, AND COMPUTER PROGRAM PRODUCT

(71) Applicant: EMC IP Holding Company LLC, Hopkinton, MA (US)

(72) Inventors: Xinlei Xu, Beijing (CN); Jian Gao, Beijing (CN); Lifeng Yang, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/249,166

(22) Filed: Jan. 16, 2019

(65) Prior Publication Data

US 2019/0220402 A1 Jul. 18, 2019

(30) Foreign Application Priority Data

Jan. 18, 2018 (CN) .......................... 2018 1 0050814

(51) Int. Cl.
*G06F 12/08* (2016.01)
*G06F 12/0802* (2016.01)
*G06F 9/455* (2018.01)

(52) U.S. Cl.
CPC ...... *G06F 12/0802* (2013.01); *G06F 9/45558* (2013.01); *G06F 2009/45583* (2013.01); *G06F 2212/65* (2013.01)

(58) Field of Classification Search
CPC ............... G06F 12/082; G06F 9/45558; G06F 2009/45583; G06F 2212/65; G06F 12/0846

See application file for complete search history.

(56) References Cited

U.S. PATENT DOCUMENTS

| 9,229,870 | B1 | 1/2016 | Kumar et al. |
| 9,507,722 | B2* | 11/2016 | Desai ................... G06F 12/0897 |
| 9,626,116 | B1* | 4/2017 | Martin ................. G06F 11/3051 |
| 9,715,435 | B2* | 7/2017 | Ramasubramaniam ..................... G06F 11/2005 |
| 9,720,822 | B2* | 8/2017 | Kimmel ............... G06F 12/0802 |
| 9,836,232 | B1* | 12/2017 | Vasquez .............. G06F 12/0804 |

(Continued)

OTHER PUBLICATIONS

Ziqi Fan, Alireza Haghdoost, David H.C. Du, Doug Voigt, "I/O-Cache: A Non-volatile Memory Based Buffer Cache Policy to Improve Storage Performance". 2015 IEEE 23rd International Symposium on Modeling, Analysis, and Simulation of Computer and Telecommunication Systems (Year: 2015).*

(Continued)

*Primary Examiner* — Khoa D Doan
(74) *Attorney, Agent, or Firm* — BainwoodHuang

(57) ABSTRACT

Techniques perform data recovery. The techniques involve: in response to receiving to-be-written data at a first cache module, storing metadata in the data into a first non-volatile cache of the first cache module. The techniques further involve storing user data in the data into a first volatile cache of the first cache module. The techniques further involve sending the metadata and the user data to a second cache module for performing data recovery on the user data. Accordingly, a larger and better guaranteed data storage space may be provided to a cache data backup/recovery system without a need to increase the battery supply capacity and even without a battery.

34 Claims, 9 Drawing Sheets

(56) References Cited

U.S. PATENT DOCUMENTS

| | | | |
|---|---|---|---|
| 9,836,404 B2* | 12/2017 | Ummadi | G06F 12/0875 |
| 9,880,762 B1* | 1/2018 | Armangau | G06F 3/0619 |
| 9,916,241 B2* | 3/2018 | McKean | G06F 12/0804 |
| 10,019,367 B2* | 7/2018 | O | G06F 12/0864 |
| 10,067,877 B1* | 9/2018 | Xu | G06F 12/0246 |
| 10,152,422 B1* | 12/2018 | Sampathkumar | G06F 12/0882 |
| 2002/0166031 A1* | 11/2002 | Chen | G06F 12/0813 711/141 |
| 2003/0005219 A1* | 1/2003 | Royer, Jr. | G06F 12/0866 711/113 |
| 2004/0148462 A1* | 7/2004 | Uysal | G06F 11/1076 711/118 |
| 2004/0181639 A1* | 9/2004 | Jarvis | G06F 11/2069 711/161 |
| 2005/0144223 A1* | 6/2005 | Yang | G06F 12/0866 709/203 |
| 2005/0177672 A1* | 8/2005 | Rao | G06F 12/0866 711/3 |
| 2005/0182906 A1* | 8/2005 | Chatterjee | G06F 11/201 711/144 |
| 2007/0150654 A1* | 6/2007 | Shin | G06F 12/0866 711/118 |
| 2008/0077743 A1* | 3/2008 | Laudon | G06F 9/505 711/141 |
| 2008/0276040 A1* | 11/2008 | Moritoki | G06F 11/1441 711/113 |
| 2009/0077312 A1* | 3/2009 | Miura | G06F 11/1441 711/113 |
| 2009/0228744 A1* | 9/2009 | Deenadhayalan | G06F 11/1004 714/48 |
| 2009/0319871 A1* | 12/2009 | Shirai | G06F 11/1068 714/773 |
| 2010/0077151 A1* | 3/2010 | Van De Waerdt | G06F 12/0804 711/132 |
| 2010/0205349 A1* | 8/2010 | Moshayedi | G06F 11/1441 711/103 |
| 2010/0205470 A1* | 8/2010 | Moshayedi | G11C 5/141 713/340 |
| 2010/0293337 A1* | 11/2010 | Murphy | G06F 12/0866 711/136 |
| 2010/0318844 A1* | 12/2010 | Matsuda | G06F 11/0727 714/6.12 |
| 2011/0022801 A1* | 1/2011 | Flynn | G06F 9/52 711/120 |
| 2012/0198123 A1* | 8/2012 | Post | G06F 11/1435 711/103 |
| 2013/0297880 A1* | 11/2013 | Flynn | G06F 11/108 711/128 |
| 2014/0013047 A1* | 1/2014 | Sawin | G06F 12/0862 711/113 |
| 2018/0246647 A1* | 8/2018 | Sankaranarayanan | G06F 12/00 |
| 2019/0057035 A1* | 2/2019 | Gao | G06F 3/061 |
| 2019/0220402 A1 | 7/2019 | Xu et al. | |
| 2019/0339865 A1* | 11/2019 | Bains | G06F 3/061 |

OTHER PUBLICATIONS

G. Sun, Y. Dong, D. Chen and J. Wei, "Data Backup and Recovery Based on Data De-Duplication," 2010 International Conference on Artificial Intelligence and Computational Intelligence, Sanya, 2010, pp. 379-382, doi: 10.1109/AICI.2010.200. (Year: 2010).*

K. Bang, S. Park, M. Jun and E. Chung, "A memory hierarchy-aware metadata management technique for Solid State Disks," 2011 IEEE 54th International Midwest Symposium on Circuits and Systems (MWSCAS), Seoul, 2011, pp. 1-4, doi: 10.1109/MWSCAS.2011.6026485. (Year: 2011).*

* cited by examiner

DATA RECOVERY METHOD, DATA RECOVERY SYSTEM, AND COMPUTER PROGRAM PRODUCT

FIELD

Embodiments of the present disclosure generally relate to the field of data storage, and more specifically, to a data recovery method, a data recovery system and a computer program product.

BACKGROUND

A storage device array typically uses dynamic random access memory (DRAM) to buffer host data written to the array prior to writing the data to the array's persistent storage devices (e.g., HDD or SSD drives). Such DRAM is often referred to as a write cache and may be combined with a read cache within the array or maintained as a separate cache. The array can provide higher I/O performance if the host writes can be acknowledged as complete as soon as the host data is in DRAM instead of waiting until the data has been written to the storage devices.

In current storage systems, a DRAM cache can act as a read and write caches and can serve user read/write I/Os. There are always dirty data in DRAM because the DRAM cache needs to store data for waiting to flush to backend drives. As random access memory, however, the DRAM cache is volatile memory, so all the data in the DRAM cache will be lost in case of powering off. To this end, the current storage system provides a battery in each storage processor (SP) including a DRAM cache. When the storage processor is powered off, the battery will keep SP running and dump data in the DRAM cache into on-board drives (e.g. SSD). Therefore, the capacity of the battery limits the size of the DRAM cache, for example, limiting to 10 Gb or below. Since the size of the DRAM cache in SP is insufficient, the DRAM cache will soon run out. At this point, SP starts to throttle user I/Os and further causes the I/O response time to increase rapidly.

SUMMARY

The embodiments of the present disclosure provide a data recovery method, a data recovery system and a computer program product.

In a first aspect of the present disclosure, provided is a method for data recovery. The method comprises: in response to receiving to-be-written data at a first cache module, storing metadata in the data into a first non-volatile cache of the first cache module; storing user data in the data into a first volatile cache of the first cache module; and sending the metadata and the user data to a second cache module for performing data recovery on the user data.

In a second aspect of the present disclosure, provided is a method for data recovery. The method comprises: at a second cache module, receiving metadata and user data in data from a first cache module; and storing the metadata and the user data into a second non-volatile cache of the second cache module.

In a third aspect of the present disclosure, provided is a system for data recovery. The system comprises: a first cache module; a second cache module; and at least one processing unit, configured to: in response to receiving to-be-written data at the first cache module, store metadata in the data into a first non-volatile cache of the first cache module; store user data in the data into a first volatile cache of the first cache module; and send the metadata and the user data to the second cache module for performing data recovery on the user data.

In a fourth aspect of the present disclosure, provided is a system for data recovery. The system comprises: a first cache module; a second cache module; and at least one processing unit, configured to: receive, at the second cache module, metadata and user data in data from the first cache module; and store the metadata and the user data into a second non-volatile cache of the second cache module.

In a fifth aspect of the present disclosure, provided is a computer program product. The computer program product is tangibly stored on a non-transient computer readable medium and comprises machine executable instructions which, when being executed, cause the machine to perform any step of the method according to the first aspect of the present disclosure.

In a sixth aspect of the present disclosure, provided is a computer program product. The computer program product is tangibly stored on a non-transient computer readable medium and comprises machine executable instructions which, when being executed, cause the machine to perform any step of the method according to the second aspect of the present disclosure.

It should be appreciated contents as described in the SUMMARY portion are not intended to limit key or important features of the embodiments of the present disclosure or used to limit the scope of the present disclosure. Other features of the present disclosure will become easier to understand from the following description.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein in the example embodiments of the present disclosure, the same reference numerals typically represent the same components.

Throughout the figures, the same or corresponding numerals denote the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other explicit and implicit definitions might be included below.

Figure 1:
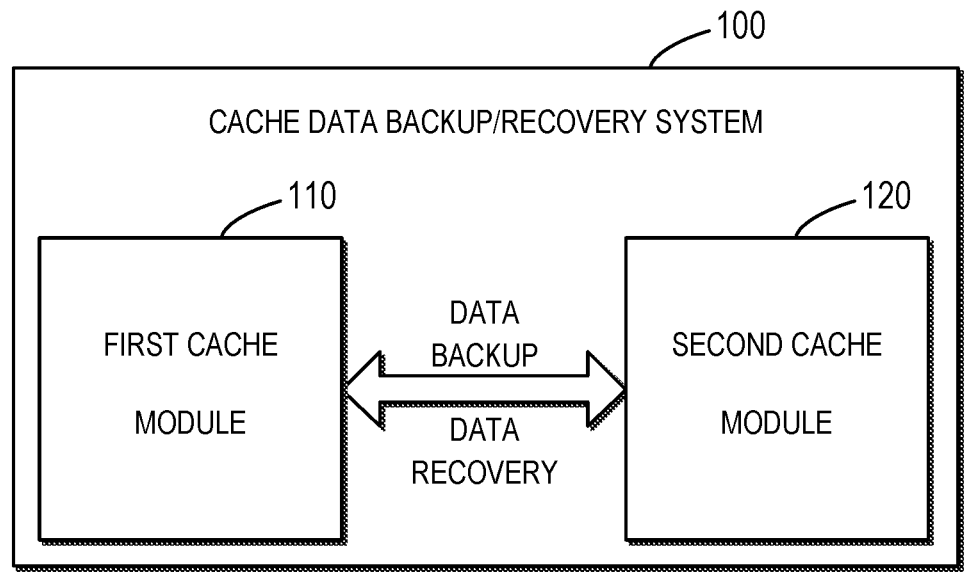
FIG. 1 shows an architecture view of a cache data backup/recovery system 100 according to the embodiments of the present disclosure.

FIG. 1 shows an architecture view of a cache data backup/recovery system 100 according to an embodiment of the present disclosure. As depicted, the cache data backup/recovery system 100 comprises a first cache module 110 and a second cache module 120. Data transfer is implemented between the first cache module 110 and the second cache module 120 for realizing data backup and data recovery. Specifically, one of the first cache module 110 and the second cache module 120 provides data backup and data recovery for the other.

As described in the BACKGROUND, since the size of the DRAM cache in SP is insufficient, the DRAM cache will soon run out, and further the I/O response time is caused to increase rapidly.

Figure 2:
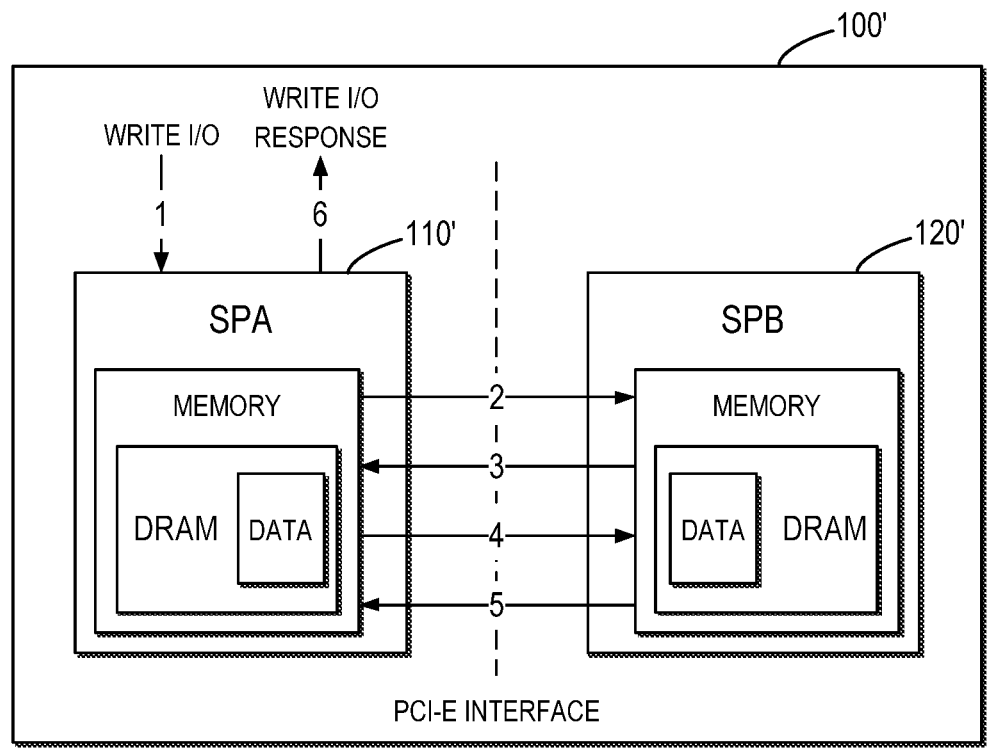
FIG. 2 shows an architecture view of a cache data backup/recovery system 100' in the prior art.

Specifically, FIG. 2 shows an architecture view of a cache data backup/recovery system 100' in the prior art. The cache data backup/recovery system 100' may, for example, comprise two SPs, i.e. a SPA 110' and a SPB 120'. In the cache data backup/recovery system 100' of the prior art, in order to provide access to dirty data in the DRAM cache in SP when a single SP is powered off or fails, the cache data backup/recovery system 100' will mirror write I/Os to DRAM caches of two SPs. A traditional DRAM cache only uses DRAM as cache media to cache the hottest data, and serve the host read/write I/Os. Therefore, the memory in each of the SPA 110' and the SPB 120' in FIG. 2 only comprises a DRAM cache.

Steps for handling a write I/O are shown in the form of numbers 1 to 6 in FIG. 2. As depicted, step 1 represents the SPA 110' receives a write I/O, steps 2 and 3 represent metadata synchronization in written data between the SPA 110' and the SPB 120', steps 4 and 5 represent user data in written data are mirrored to the DRAM cache in the SPA 110' and the SPB 120' respectively, and step 6 represents the SPA 110' makes a response indicating write completion to an up-layer (driver) system sending the write I/O. As shown in FIG. 2, data transfer between the SPA 110' and the SPB 120' is implemented through a PCI-E interface. Since one SP of the SPA 110' and the SPB 120' needs to mirror data for the other SP for recovering user data in the other SP, when the DRAM cache in the SPA 110' and the SPB 120' handles the write I/O, the DRAM cache space might reduce to a half, and further becomes insufficient. In the meantime, since both DRAM caches in the SPA 110' and the SPB 120' are volatile memory, if one SP is powered off, then all data in this SP will be lost, at which point all data in the other SP need to be mirrored to this SP. In addition, if both the SPs are powered off, then all data in both the SPs will be lost.

In order to at least partially overcome the foregoing problems in the prior art, the embodiments of the present disclosure provide a data recovery solution for providing larger and better guaranteed data storage space to a cache data backup/recovery system without a need to increase the battery supply capacity and even without a battery.

According to the embodiments of the present disclosure, the cache data backup/recovery system 100 is provided with a Non-Volatile Dual In-line Memory Module (NVDIMM). NVDIMM is random-access memory for computers. "Non-volatile" means that NVDIMM keeps data stored therein from being lost even when electrical power is removed either from an unexpected power loss, system crash, or normal shutdown. "Dual in-line" identifies such a memory as using the DIMM package. By means of NVDIMMs, it is possible to improve application performance, data security and system crash recovery time.

Figure 3:
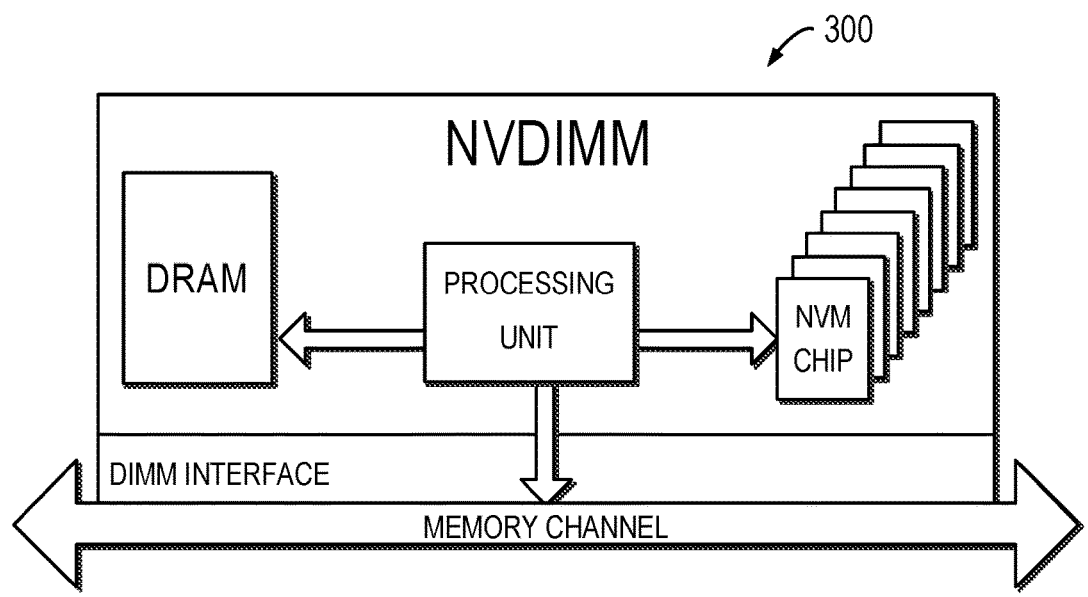
FIG. 3 shows a schematic view of a non-volatile dual in-line memory module 300 according to the embodiments of the present disclosure.

Based on the foregoing NVDIMM, some fast non-volatile technologies like 3d Xpoint have been developed in recent years. They have low latency and high capacity. More vendors integrate these non-volatile memory (NVM), small DRAM caches (typically 10%~5% percent of NVM capacity) with fast/low latency processing units (e.g. CPU) to implement NVDIMM without using a super capacitor, avoid weakness of unstable lifecycle for traditional NVDIMMs, and further reduce the price. The capacity of this new NVDIMM can grow to several hundreds of GBs or even to TBs. The foregoing NVDIMM may be as shown in FIG. 3, which illustrates a schematic view of a Non-Volatile Dual In-line Memory Module 300 according to the embodiments of the present disclosure. The prices of these kinds of NVDIMMs are between DRAM and SSD, and the following order is followed in terms of I/O latency: DRAM<NVDIMM<NVMe<SSDs. That is, the latency of NVDIMM is larger than DRAM but less than SSD. Therefore, by using NVDIMM in the cache data backup/recovery system, better storage capacity and storage speed can be achieved while the price is kept economical.

In the embodiments of the present disclosure, NVDIMM is integrated into SP's enclosure to form a new cache module, so that a cache module comprising only a DRAM cache is optimized as a cache module having a hybrid cache.

Figure 4:
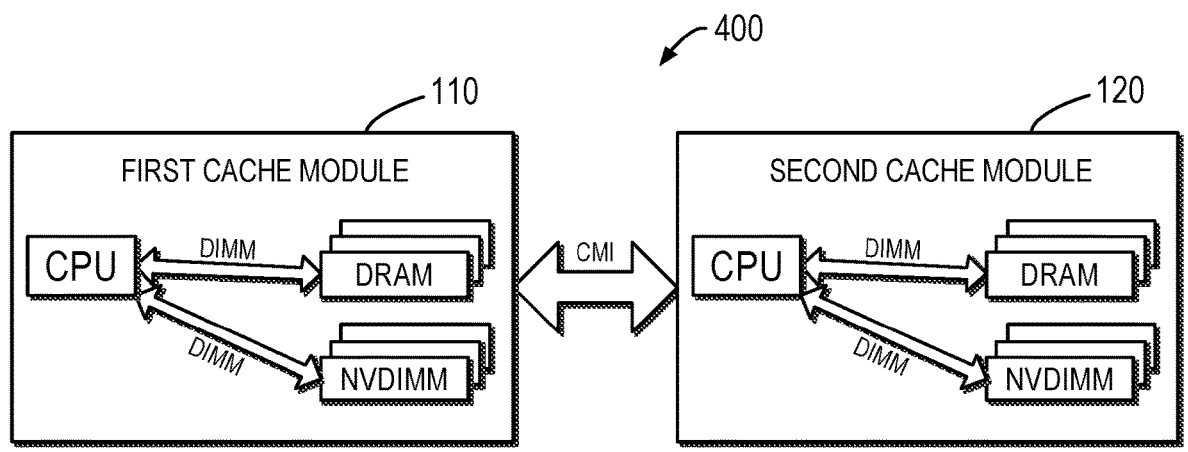
FIG. 4 shows a schematic view of a cache module pair 400 according to the embodiments of the present disclosure.

FIG. 4 shows a schematic view of a cache module pair 400 according to the embodiments of the present disclosure. FIG. 4 comprises one pair of cache modules, namely the first cache module 110 and the second cache module 120. As depicted, each of the first cache module 110 and the second cache module 120 comprises a CPU acting as a processing unit, multiple DRAM caches and multiple NVDIMM caches. It should be appreciated that the respective numbers of CPU, DRAM caches and NVDIMM caches shown in FIG. 4 are merely by way of example and not intended to limit the scope of the present disclosure in any way. As depicted, the CPU is respectively connected with DRAM and NVDIMM in the dual-in-line (DIMM) form and transfers data and instructions. In the meantime, the first cache module 110 and the second cache module 120 transfer data via a communication manager interface (CMI). It should be appreciated that the data and instructions transfer mode is merely by way of example and not intended to limit the scope of the present disclosure in any way. Actually, since the cache data backup/recovery system has DIMM sockets, it only needs to insert NVDIMMs into DIMM sockets, and then cache modules are packaged.

According to the embodiments of the present disclosure, after integrating NVDIMMs into cache modules and thus forming the first cache module 110 and the second cache module 120 each having DRAM caches and NVDIMM caches, each cache in the first cache module 110 and the second cache module 120 has a uniform cache memory space.

Figure 5:
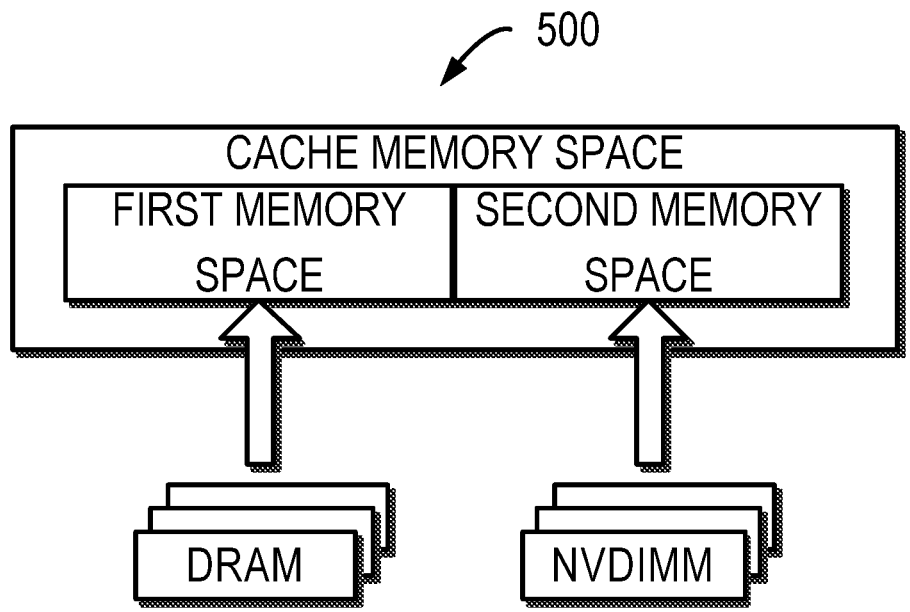
FIG. 5 shows a schematic view of a space source 500 of a cache memory space according to the embodiments of the present disclosure.

FIG. 5 shows a schematic view of a space source 500 of a cache memory space according to the embodiments of the present disclosure. As depicted, the uniform cache memory space comprises a first memory space and a second memory space. The first memory space is from DRAM caches, and the second memory space is from NVDIMM caches.

Figure 6:
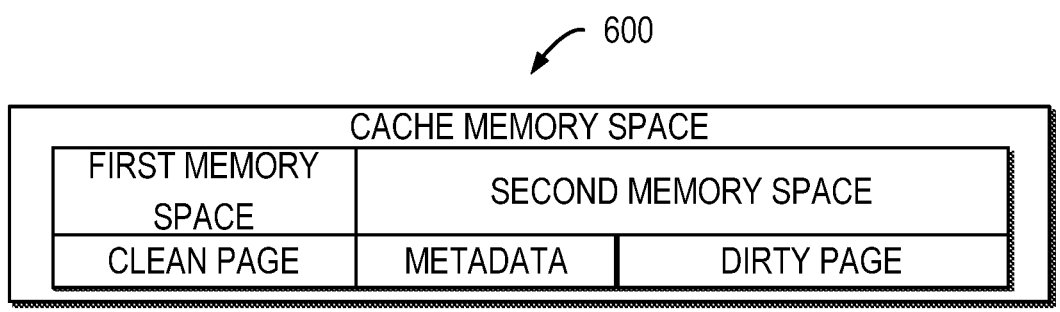
FIG. 6 shows a schematic view of storage contents 600 of a cache memory space according to the embodiments of the present disclosure.

According to the embodiments of the present disclosure, the first memory space and the second memory space as shown in FIG. 5 may store different contents. FIG. 6 shows a schematic view of storage contents 600 in a cache memory space according to the embodiments of the present disclosure. As depicted, the first memory space stores clean pages, and the second memory space stores metadata and dirty pages. In other words, all clean pages in the memory will be mapped to the first memory space, while all metadata and dirty pages will be mapped to the second memory space.

Figure 7:
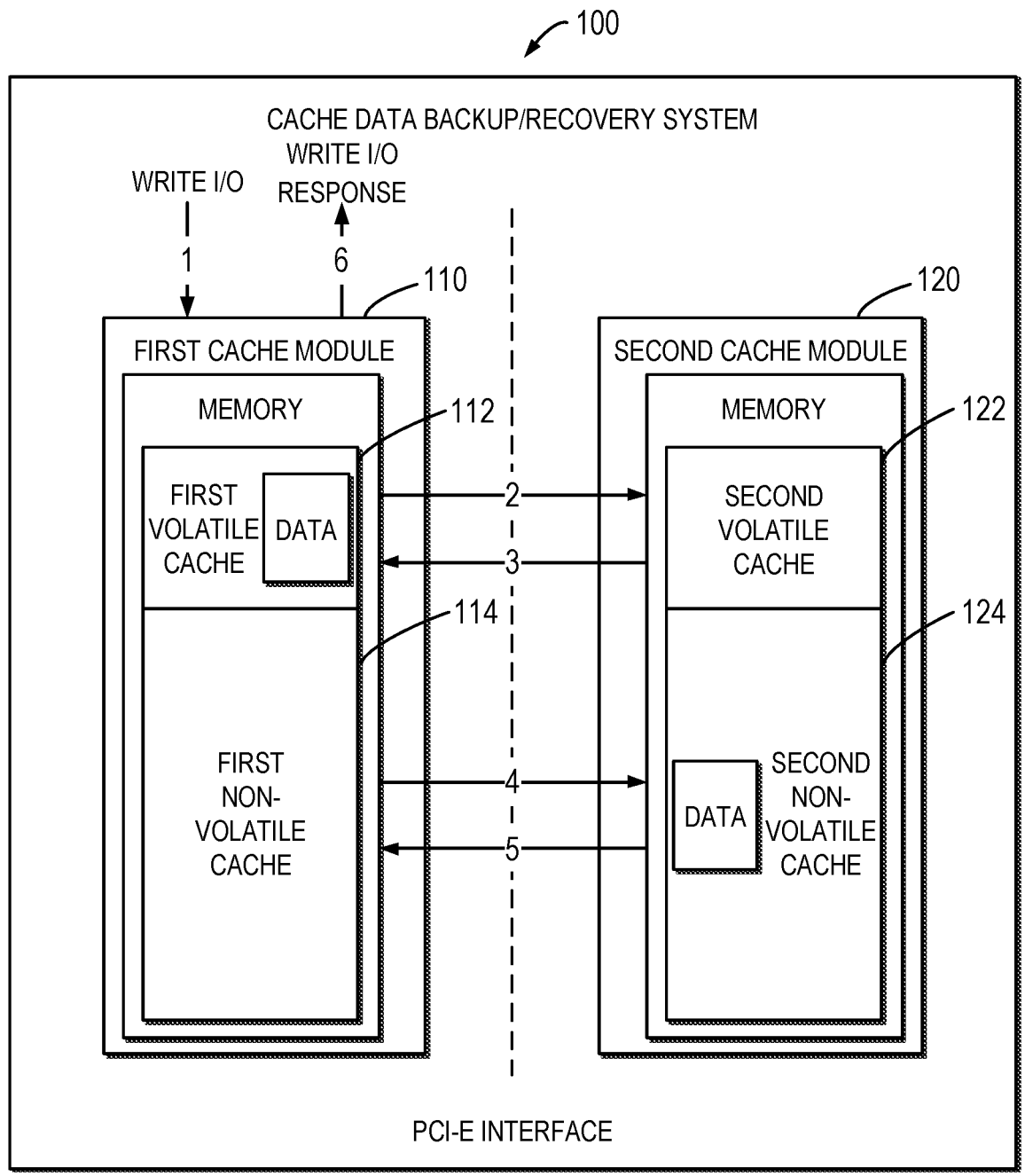
FIG. 7 shows a more detailed schematic view of a cache data backup/recovery system 100 according to the embodiments of the present disclosure.

A detailed description is presented below to a structure of a cache data backup/recovery system 100 according to the embodiments of the present disclosure. With reference to FIG. 7, there is shown a more detailed schematic view of the cache data backup/recovery system 100 according to the embodiments of the present disclosure. As depicted, the data backup/recovery system 100 comprises a first cache module 110 and a second cache module 120, among which the first cache module 110 comprises a first volatile cache 112 and a first non-volatile cache 114, and the second cache module 120 comprises a second volatile cache 122 and a second non-volatile cache 124.

It should be appreciated that the first volatile cache 112 and the second volatile cache 122 each may correspond to a DRAM cache, and the first non-volatile cache 114 and the second non-volatile cache 124 each may correspond to NVDIMM. However, the correspondences are merely by way of example and not intended to limit the scope of the present disclosure in any way.

The cache data backup/recovery system 100 according to the embodiments of the present disclosure as shown in FIG. 7 mainly differs from the cache data backup/recovery system 100' according to the prior art as shown in FIG. 2 by adding the first non-volatile cache 114 and the second non-volatile cache 124. It should be appreciated although although the first cache module 110 and the second cache uni 120 in FIG. 7 do not show a corresponding processing unit, they may comprise a processing unit respectively, and the processing unit may perform corresponding operations. Here a processing unit is omitted in FIG. 7 in order to briefly describe the embodiments of the present disclosure, rather than limiting the scope of the present disclosure in any way.

Steps for handling a write I/O as performed by the cache data backup/recovery system 100 are shown in the form of numbers 1 to 6 in FIG. 7.

In general, when the first cache module 110 receives a write I/O, user data of the write I/O will be cached in the form of dirty pages, and then the first cache module 110 makes a response indicating write completion to an up-layer (driver) system sending the write I/O. The dirty pages where user data are stored will be stored in the first volatile cache 112 of the first cache module 110 for possible fast use, and will be stored in the second non-volatile cache 124 of the second cache module 120 for backup and recovery. It should be appreciated that the write I/O coming from an up-layer (driver) system is merely by way of example and not intended to limit the scope of the present disclosure in any way. According to the embodiments of the present disclosure, the write I/O may be from an up-layer system, an external system, an intermediate component or any element or module that might send or forward the write I/O to the cache data backup/recovery system 100.

Specifically, in FIG. 7, step 1 represents the first cache module 110 receives a write I/O, steps 2 and 3 represent metadata synchronization in written data (also referred to as metadata communication) between the first cache module 110 and the second cache module 120, steps 4 and 5 represent user data in written data are stored into the first volatile cache 112 in the first cache module 110 and the second non-volatile cache 124 in the second cache module 120 respectively, and step 6 represents the first cache module 110 makes a response indicating write completion to an up-layer (driver) system sending the write I/O. Like FIG. 2, data transfer between the first cache module 110 and the second cache module 120 is implemented via a PCI-E interface.

According to the embodiments of the present disclosure, caching dirty pages where user data received by the first cache module 110 are stored into the first volatile cache 112 and the second non-volatile cache 124 is mainly out of consideration for the following: first of all, regarding the I/O response speed, the first volatile cache 112 and the second volatile cache 124 typically have a much faster I/O response speed than the first non-volatile cache 114 and the second non-volatile cache 124, e.g. the former may be 10 times and even more faster than the latter. In addition, after the first cache module 110 receives the write I/O, there is a high possibility that other write I/Os and read I/Os within the same LUN (logical unit number) and LBA (logical block address) range will be sent to the first cache module 110. Finally, after the first cache module 110 receives the write I/O, for potential read I/Os of the same user data, it is obviously more efficient to store user data into the first volatile cache 112 than to hit the read I/O cache.

Based on the more detailed schematic view of the cache data backup/recovery system 100 according to the embodiments of the present disclosure shown in FIG. 7, with reference to FIGS. 8 to 10, a detailed description is presented below to a data recovery method and concrete flows and operations of the first cache module 110 and the second cache module 120 according to the embodiments of the present disclosure. It should be appreciated that the flows and operations to be described below may further comprise additional steps and operations that are not shown and/or may omit steps and operations that are shown, and the scope of the present disclosure is not limited in this regard.

Figure 8:
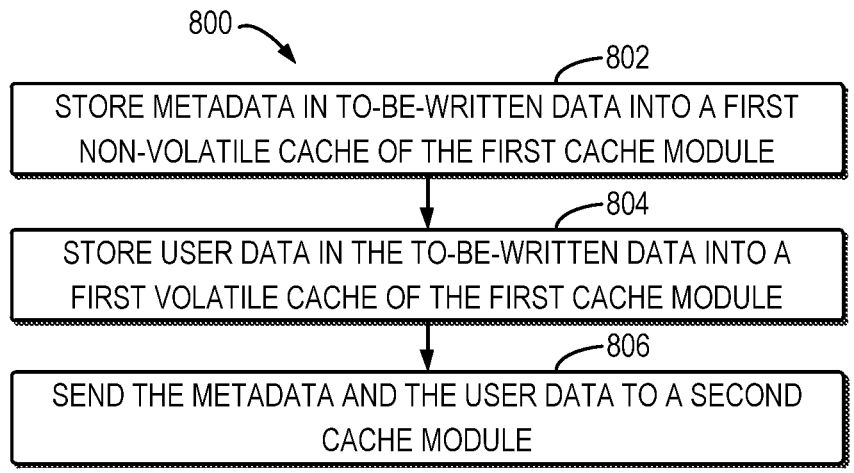
FIG. 8 shows a flowchart of a data recovery method 800 according to the embodiments of the present disclosure.

FIG. 8 shows a flowchart of a data recovery method 800 according to the embodiments of the present disclosure. Specifically, the method 800 describes the flow of data recovery from the perspective of the first cache module 110. It should be appreciated that the method 800 may further comprise an additional step that is not shown and/or may omit a step that is shown, and the scope of the present disclosure is not limited in this regard.

The method 800 starts from block 802 in which the first cache module 110, in response to receiving to-be-written data from an up-layer system, stores metadata in the to-be-written data into the first non-volatile cache 114 of the first cache module 110.

In block 804, the first cache module 110 stores user data in the to-be-written data into the first volatile cache 112 of the first cache module 110.

In block 806, the first cache module 110 sends the metadata and the user data in the to-be-written data to the second cache module 120, for performing data recovery on the user data by receiving the user data from the second cache module 120 where necessary.

Figure 9:
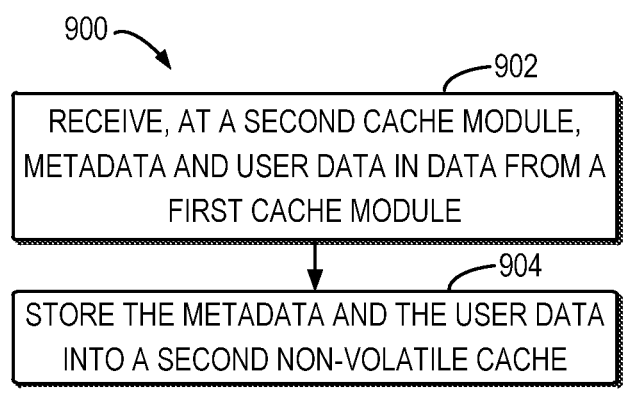
FIG. 9 shows a flowchart of a data recovery method 900 according to the embodiments of the present disclosure.

FIG. 9 shows a flowchart of a data recovery method 900 according to the embodiments of the present disclosure. Specifically, the method 900 describes the flow of data recovery from the perspective of the second cache module 120. It should be appreciated that the method 900 may further comprise an additional step that is not shown and/or may omit a step that is shown, and the scope of the present disclosure is not limited in this regard.

The method 900 starts from block 902 in which the second cache module 120 receives metadata and user data in data from the first cache module 110. It should be appreciated that the step in block 902 may correspond to the step in block 806 of the method 800. That is, the metadata and the user data received by the second cache module 120 in the step in block 902 may be those sent to the second cache module 120 by the first cache module 110 in the step in block 806 of the method 800.

In block 904, the second cache module 120 stores the metadata and the user data received in the step in block 902 into the second non-volatile cache 124 of the second cache module 120.

According to the embodiments of the present disclosure, in the methods 800 and 900, metadata are stored into the first non-volatile cache 114 of the first cache module 110 and the second non-volatile cache 124 of the second cache module 120 respectively. This is to guarantee that metadata will not be lost even where the first cache module 110 and/or the second cache module 120 are/is powered off. According to the embodiments of the present disclosure, metadata in the to-be-written data comprise information such as attributes of user data in the to-be-written data. Therefore, when recovering user data, first corresponding metadata need to be found in the first non-volatile cache 114 and the second non-volatile cache 124 by comparing metadata, and then corresponding user data are found through the found metadata.

Figure 10A:
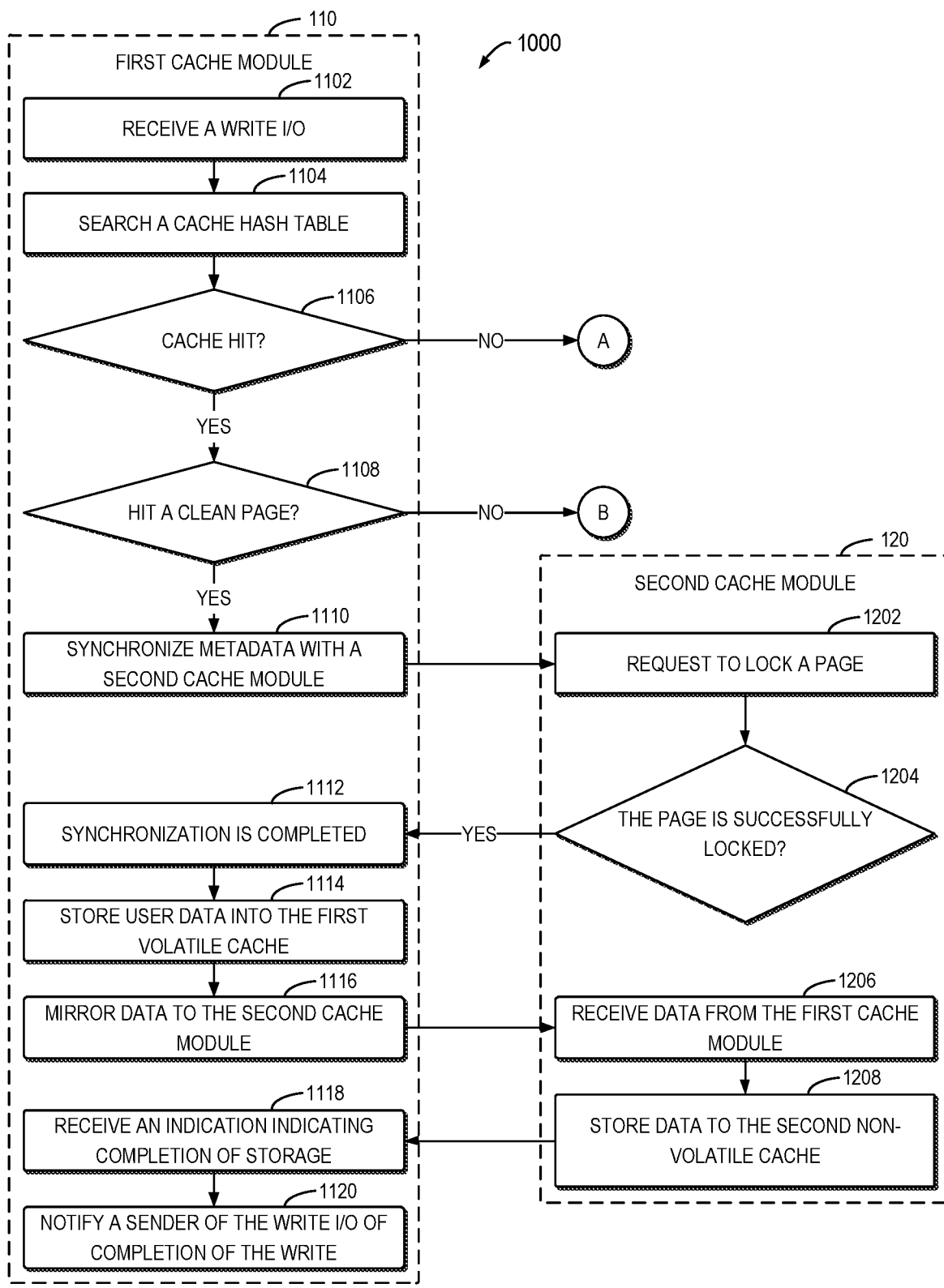
FIGS. 10A to 10C (collectively referred to as FIG. 10 below) show a schematic view of an operation process 1000 of a first cache module and a second cache module according to the embodiments of the present disclosure.
Figure 10B:
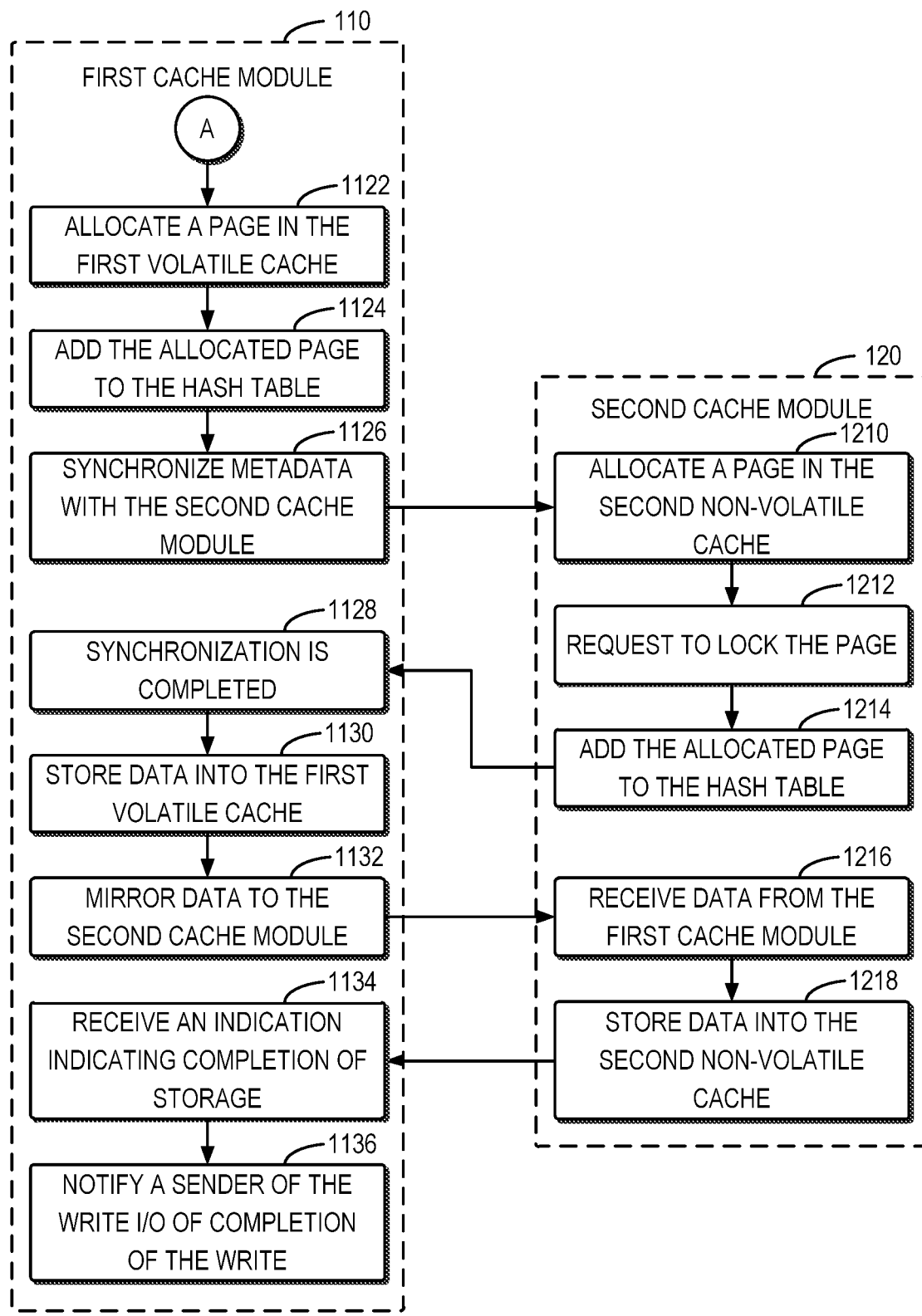
Figure 10C:
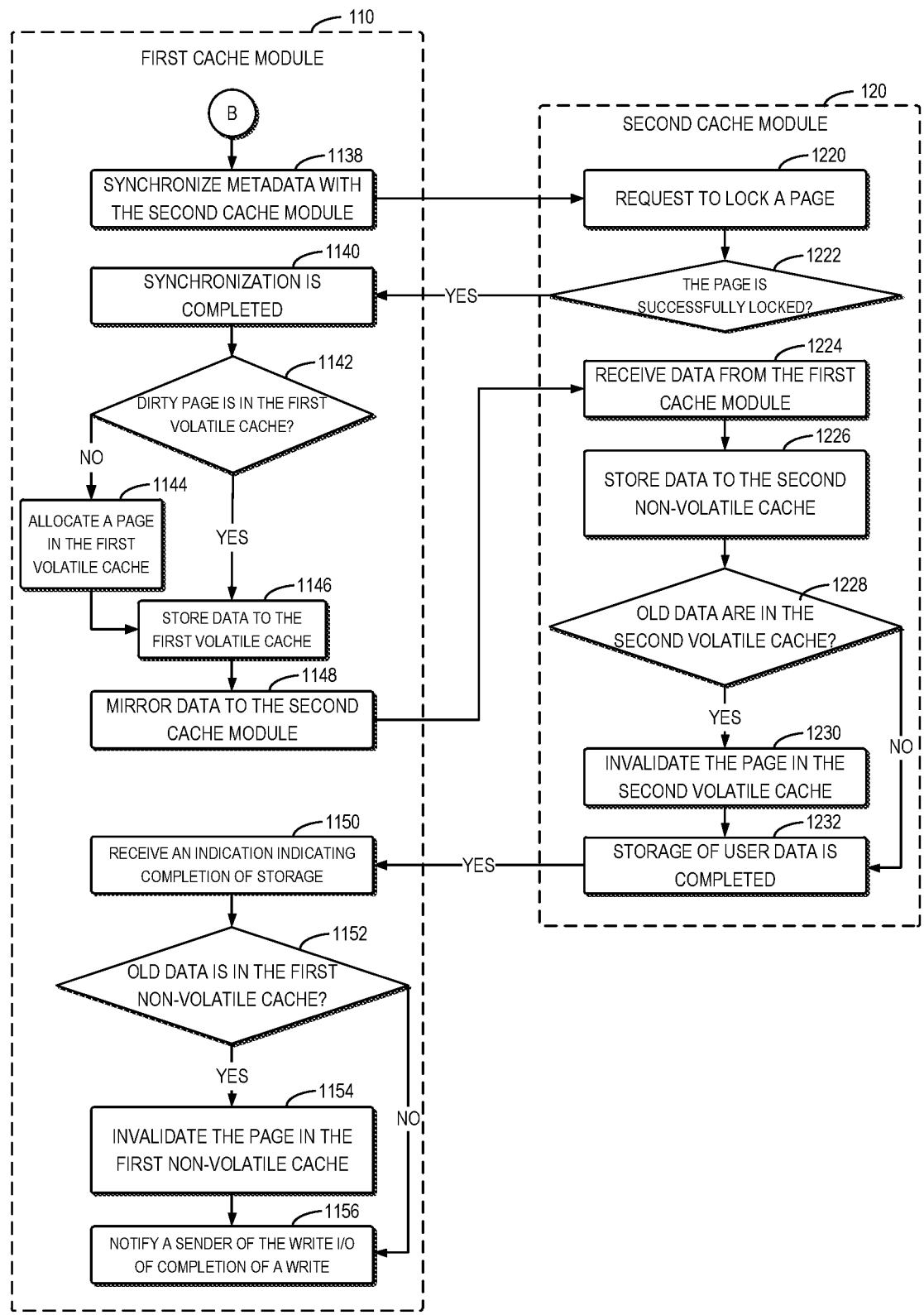

FIGS. 10A to 10C each show a schematic view of an operation process 1000 of a first cache module and a second cache module according to the embodiments of the present disclosure. The operation process 1000 is an aggregation and further refinement of steps of the methods 800 and 900. It will be appreciated that the operation process 1000 is not the unique aggregation and refinement of steps of the methods 800 and 900 and is not intended to limit the methods 800 and 900 in any way.

The operation process 1000 is jointly shown by FIGS. 10A, 10B and 10C. Each of FIGS. 10A, 10B and 10C comprises a first cache module 110 and a second cache module 120 which are shown in the form of dashed boxes, wherein blocks in the first cache module 110 mean operations represented by them are performed in the first cache module 110, and blocks in the second cache module 120 mean operations represented by them are performed in the second cache module 120. Specifically, numerals of blocks corresponding to the operations performed in the first cache module 110 start with "11," and numerals of blocks corresponding to the operations performed in the second cache module 120 start with "12."

The operation process 1000 starts from block 1102 in which the first cache module 110 receives a write I/O. According to the embodiments of the present disclosure, the write I/O may represent to-be-written data.

In block 1104, in response to receiving the write I/O, the first cache module 110 searches its own cache hash table for determining (or ascertaining) whether there is a cache hit in its cache or not. According to the embodiments of the present disclosure, this step may comprise determining whether an allocated cache page for the to-be-written data (especially for user data in the to-be-written data) is present in the first cache module 110.

In block 1106, in response to determining (or detecting) that there is a cache hit in block 1104, i.e. an allocated cache page for the user data is present in the first cache module 110, the operation process proceeds to block 1108; otherwise, the operation process proceeds to A, i.e. an operation process shown in FIG. 10B.

In block 1108, it is determined whether a page to which the cache hit is directed is a clean page or not. According to the embodiments of the present disclosure, this step may comprise determining whether the allocated cache page in the first cache module 110 is a clean page or not. In response to the page being a clean page, the operation process proceeds to block 1110; otherwise, the operation process proceeds to B, i.e. an operation process shown in FIG. 10C.

In block 1110, the first cache module 110 synchronizes data with the second cache module 120, which may comprise the first cache module 110 sending a metadata synchronization request to the second cache module 120. According to the embodiments of the present disclosure, the first cache module 110 synchronizing metadata with the second cache module 120 may comprise the first cache module 110 storing metadata in the to-be-written data into the first non-volatile cache 114 and sending the metadata to the second cache module 120.

In block 1202, in response to receiving the metadata synchronization request from the first cache module 110, the second cache module 120 performs metadata synchronization and requests to lock a page in the second non-volatile cache 124 which will be used for storing user data in the to-be-written data. According to the embodiments of the present disclosure, the second cache module 120 performs the metadata synchronization with the first cache module 110 by storing the metadata received from the first cache module 110 into the second non-volatile cache 124.

In block 1204, in response to the request for page locking in block 1202, the second cache module 120 locks the page. If the page is successfully locked, the second cache module 120 sends to the first cache module 110 a message indicating success in the page locking, and the operation process proceeds to block 1112. If the page locking fails, this means a pending I/O in the page to be locked exists, at which point the second cache module 120 waits for the pending I/O to be completed and then continues to lock the page.

In block 1112, in response to receiving from the second cache module 120 the message indicating the success in the page locking, the first cache module 110 determines that the metadata synchronization is completed.

In block 1114, in response to determining that the metadata synchronization is completed, the first cache module 110 stores the user data in the to-be-written data into the first non-volatile cache 112.

In block 1116, the first cache module 110 sends the user data to the second cache module 120.

In block 1206, the second cache module 120 receives the user data from the first cache module 110.

In block 1208, in response to receiving the user data from the first cache module 110, the second cache module 120 stores the user data into the second non-volatile cache 124 and sends to the first cache module 110 a message indicating completion of storage of the user data.

In block 1118, the first cache module 110 receives from the second cache module 120 the message indicating completion of storage of the user data.

In block 1120, in response to receiving from the second cache module 120 the message indicating completion of storage of the user data, the first cache module 110 notifies a sender of the write I/O of completion of the write.

Operations comprised in the operation process 1000 when it is determined in block 1106 that there is a cache hit and when it is determined in block 1108 that a page to which the cache hit is directed is a clean page have been described with reference to FIG. 10A. Hereinafter, with reference to FIG. 10B, description is presented to operations comprised in the operation process 1000 when it is determined in block 1106 that there is no cache hit (i.e. cache miss).

In block 1122, in response to determining in block 1106 that there is no cache hit, the first cache module 110 allocates a page in the first volatile cache 112, i.e. allocates a volatile cache page.

In block 1124, the first cache module 110 adds the page allocated in the operation in block 1122 to its own cache hash table for a possible later search. According to the embodiments of the present disclosure, the newly allocated page does not have a corresponding item in the cache hash table of the cache module, so it needs to be added to the cache hash table for searching.

In block 1126, the first cache module 110 synchronizes data with the second cache module 120, which may comprise the first cache module 110 sending to the second cache module 120 a metadata synchronization request and a message indicating there is no cache hit in the first cache module 110. According to the embodiments of the present disclosure, when it is determined in block 1106 that there is no cache hit, in the operation in block 1126, the first cache module 110 synchronizing metadata with the second cache module 120 may comprise: the first cache module 110 storing metadata in the to-be-written data into the first non-volatile cache 114, sending the metadata to the second cache module 120, and sending to the second cache module 120 a message indicating in the first cache module 110 there is no allocated cache page for the user data.

In block 1210, in response to receiving the metadata synchronization request from the first cache module 110, the second cache module 120 performs metadata synchronization and allocates a page in the second non-volatile cache 124, i.e. allocates a non-volatile cache page. According to the embodiments of the present disclosure, the second cache module 120 performs the metadata synchronization with the first cache module 110 by storing the metadata received from the first cache module 110 into the second non-volatile cache 124.

In block 1212, the second cache module 120 requests to lock the non-volatile cache page allocated in the operation in block 1210.

In block 1214, in response to the request for page locking in block 1202, the second cache module 120 locks the page and adds the page to its own cache hash table. Since the page is a newly allocated page, usually there is no pending I/O for the page. Therefore, after the page is successfully locked, the second cache module 120 sends to the first cache module 110 a message indicating success in the page locking.

In block 1128, in response to receiving from the second cache module 120 the message indicating the success in the page locking, the first cache module 110 determines that the metadata synchronization is completed.

In block 1130, in response to determining that the metadata synchronization is completed, the first cache module 110 stores the user data in the to-be-written data into the first non-volatile cache 112.

In block 1132, the first cache module 110 sends the user data to the second cache module 120.

In block 1216, the second cache module 120 receives the user data from the first cache module 110.

In block 1218, in response to receiving the user data from the first cache module 110, the second cache module 120 stores the user data into the second non-volatile cache 124 and sends to the first cache module 110 a message indicating completion of storage of the user data.

In block 1134, the first cache module 110 receives from the second cache module 120 the message indicating completion of storage of the user data.

In block 1136, in response to receiving from the second cache module 120 the message indicating completion of storage of the user data, the first cache module 110 notifies a sender of the write I/O of completion of the write.

Operations comprised in the operation process 1000 when it is determined in block 1106 that there is no cache hit (i.e. cache miss) have been described with reference to FIG. 10B. Hereinafter, with reference to FIG. 10C, description is presented to operations comprised in the operation process 1000 when it is determined in block 1108 that the page to which the cache hit is directed is not a clean page (i.e. the allocated cache page in the first cache module 110 is not a clean page).

In block 1138, the first cache module 110 synchronizes data with the second cache module 120, which may comprise the first cache module 110 sending a metadata synchronization request to the second cache module 120. According to the embodiments of the present disclosure, the first cache module 110 synchronizing metadata with the second cache module 120 may comprise the first cache module 110 storing metadata in the to-be-written data into the first non-volatile cache 114 and sending the metadata to the second cache module 120.

In block 1220, in response to receiving the metadata synchronization request from the first cache module 110, the second cache module 120 performs metadata synchronization and requests to lock a page in the second non-volatile cache 124 which will be used for storing user data in the to-be-written data. According to the embodiments of the present disclosure, the second cache module 120 performs the metadata synchronization with the first cache module 110 by storing the metadata received from the first cache module 110 into the second non-volatile cache 124.

In block 1222, in response to the request for page locking in block 1220, the second cache module 120 locks the page. If the page is successfully locked, the second cache module 120 sends to the first cache module 110 a message indicating success in the page locking, and the operation process proceeds to block 1140. If the page locking fails, this means a pending I/O in the page to be locked exists, at which point the second cache module 120 waits for the pending I/O to be completed and then continues to lock the page.

In block 1140, in response to receiving from the second cache module 120 the message indicating the success in the page locking, the first cache module 110 determines that the metadata synchronization is completed.

In block 1142, in response to determining that the metadata synchronization is completed, the first cache module 110 determines whether a dirty page determined in the operation in block 1108 (since it is determined in block 1108 the page to which the cache hit is directed is not a clean page, the page is a dirty page) is present in the first volatile cache 112 or not. If the dirty page is absent from the first volatile cache 112, the operation process proceeds to block 1144. If the dirty page is present in the first volatile cache 112, the operation process proceeds to block 1146.

In block 1144, in response to determining that in block 1142 the dirty page is absent from the first volatile cache 112, the first cache module 110 establishes a virtual volatile cache page in the first volatile cache 112, and stores user data in the to-be-written data into the dirty page (i.e. allocated cache page) in the first volatile cache 112 through the virtual volatile cache page. According to the embodiments of the present disclosure, when it is determined in block 1108 that the page to which the cache hit is directed is a dirty page, since the hit page is a dirty page, it is specified the user data in the to-be-written data is for replacing data in the dirty page. At this point, a virtual page may be established to store the user data in the to-be-written data, and then the user data is written to the dirty page to replace original data in the dirty page. In block 1146, when the operation process proceeds to block 1146 in response to a page being allocated in the first volatile cache 112 in block 1144, the first cache module 110 stores the user data in the to-be-written data into the page allocated in the first volatile cache 112.

In block 1148, the first cache module 110 sends the user data to the second cache module 120.

In block 1224, the second cache module 120 receives the user data from the first cache module 110.

In block 1226, in response to receiving the user data from the first cache module 110, the second cache module 120 stores the user data into the second non-volatile cache 124.

In block 1228, in response to storing the user data into the second non-volatile cache 124, the second cache module 120 determines whether old data (data corresponding to the data in the dirty page determined in the operation in block 1108) is present in the second volatile cache 122 or not. If yes, then the operation process proceeds to block 1230. If not, i.e. old data is present in the second non-volatile cache 124, then the operation process proceeds to block 1232.

In block 1230, in response to determining in block 1228 that old data is present in the second volatile cache 122, the second cache module 120 invalidates a volatile cache page where the old data is present in the second volatile cache 122.

In block 1232, in response to determining in block 1228 that old data is absent from the second volatile cache 122 or invalidating in block 1230 a volatile cache page where the old data is present in the second volatile cache 122, the second cache module 120 sends to the first cache module 110 a message indicating completion of storage of the user data.

In block 1150, the first cache module 110 receives from the second cache module 120 the message indicating completion of storage of the user data.

In block 1152, in response to receiving from the second cache module 120 the message indicating completion of storage of the user data, the first cache module 110 determines whether old data (i.e. data corresponding to the data in the dirty page determined in the operation in block 1108) is present in the first volatile cache 112 or not. If yes, then the operation process proceeds to block 1154. If not, i.e. old data is present in the first non-volatile cache 114, then the operation process proceeds to block 1156.

In block 1154, in response to determining in block 1152 that old data is present in the first volatile cache 112, the second cache module 110 invalidates a cache page in the first volatile cache 112 allocated in block 1146.

In block 1156, in response to determining in block 1152 that old data is absent from the second volatile cache 122 or invalidating in block 1154 a cache page in the first volatile cache 112 allocated in block 1146, the first cache module 110 notifies a sender of the write I/O of completion of the write.

Operations comprised in the operation process 1000 when it is determined in block 1108 that a page to which the cache hit is directed is not a clean page (i.e. the allocated cache page in the first cache module 110 is not a clean page) have been described with reference to FIG. 10C. It should be appreciated not all the steps in FIG. 10 are essential, and according to the embodiments of the present disclosure, various feasible adjustments like combination, addition and deletion may be made to the steps in FIG. 10 without affecting the protection scope of the present disclosure.

The operation process 1000 of the first cache module and the second cache module according to the embodiments of the present disclosure has been described with reference to FIG. 10, wherein the operation process 1000 mainly involves writing metadata data and user data in to-be-written data to the first cache module 110 and the second cache module 120 respectively. For example, the metadata are written to the first non-volatile cache 114 and the second non-volatile cache 124 respectively, and the user data are written to the first volatile cache 112 and the second non-volatile cache 124 respectively. When user data in the first volatile cache 112 of the first cache module 110 is lost for reboot and other reason, a user may obtain the user data from the second non-volatile cache 124 of the second cache module 120 to recover the user data in the first volatile cache 112.

Specifically, the first cache module 110 may request the second cache module 120 for metadata and user data stored into the second non-volatile cache 124. After obtaining the metadata from the second non-volatile cache 124, the first cache module 10 will compare the obtained metadata with metadata stored into the first non-volatile cache 114, for determining that user data corresponding to user data lost in the first volatile cache 112. After determining that the corresponding user data are latest, the first cache module 110 recovers user data lost in the first volatile cache 112 by using user data obtained from the second non-volatile cache 124.

In particular, when the first cache module 110 and the second cache module 120 are powered off successively or simultaneously and further user data in the first volatile cache 112 and the second volatile cache 122 are lost, the first cache module 110 and the second cache module 120 compare metadata successively, determine corresponding user data and determine whether the corresponding user data are latest or not. After determining that the latest user data, the first cache module 110 and the second cache module 120 recover the lost user data in the first volatile cache 112 and the second volatile cache 122 respectively.

In particular, for example, when the second cache module 120 becomes completely unavailable due to serious failure, the first cache module 110 may map user data in the first volatile cache 112 to the first non-volatile cache 124, for prevening the user data in the first volatile cache 112 from being lost when the first cache module 110 is powered off.

It is noteworthy according to the embodiments of the present invention, although there is no need for hardware modification in order to implement the technical solution of the present disclosure, BIOS needs to be modified for perventing data in the NVDIMM cache from being erased. For example, BIOS may be arranged not to write 0 to the NVDIMM cache memory space.

As seen from the foregoing description taken with reference to FIGS. 1 to 10, the technical solution according to the embodiments of the present disclosure is provided with many advantages over the prior art. In accordance with certain embodiments, such problems in the prior art may be eliminated as the insufficient size of the DRAM cache causes the DRAM cache to run out easily and further causes the I/O response time to increase rapidly. Specifically, the technical solution provided by the embodiments of the present disclosure makes it possible to provide a larger and better guaranteed data storage space for the cache data backup/recovery system without a need to increase the battery supply capacity and even without a battery. In addition, the technical solution provided by the embodiments of the present disclosure may be easily implemented by leveraging an existing cache data backup/recovery system to integrate the NVDIMM cache into the DRAM cache without changing hardware or platform. Finally, the technical solution provided by the embodiments of the present disclosure may easily and economically extend the cache space in the cache data backup/recovery system and further improve the overall I/O performance for the platform.

Figure 11:
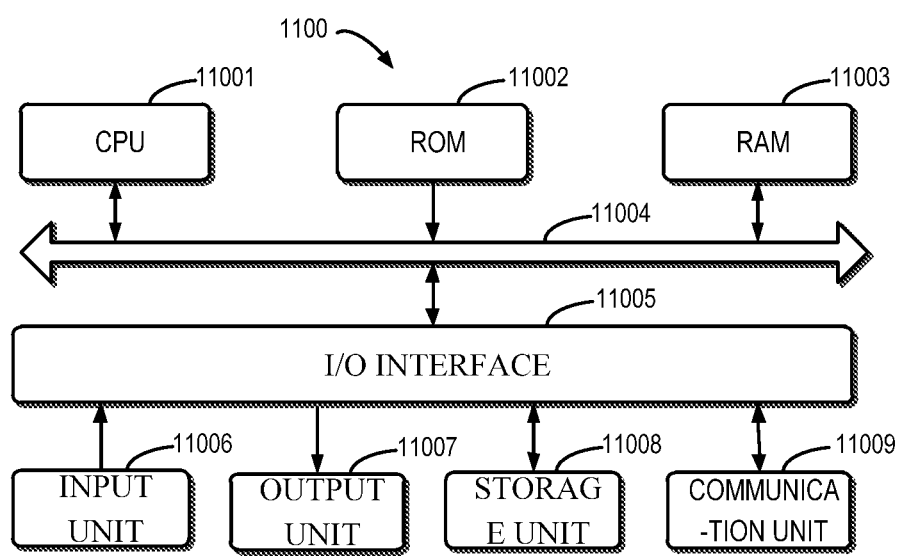
FIG. 11 shows a schematic block diagram of an example device 1100 which is applicable to implement the embodiments of the present disclosure.

FIG. 11 shows a schematic block diagram of an example device 1100 suitable for implementing the embodiments of the present disclosure. As depicted, the device 1100 comprises a central processing unit (CPU) 11001 which is capable of performing various appropriate actions and processes in accordance with computer program instructions stored in a read only memory (ROM) 11002 or computer program instructions loaded from a storage unit 11008 to a random access memory (RAM) 11003. In the RAM 11003, there are also stored various programs and data required by the device 1100 when operating. The CPU 11001, the ROM 11002 and the RAM 11003 are connected to one another via a bus 11004. An input/output (I/O) interface 11005 is also connected to the bus 11004.

Multiple components in the device 1100 are connected to the I/O interface 11005: an input unit 11006 including a keyboard, a mouse, or the like; an output unit 11007, such as various types of displays, a loudspeaker or the like; a storage unit 11008, such as a disk, an optical disk or the like; and a communication unit 11009, such as a LAN card, a modem, a wireless communication transceiver or the like. The communication unit 11009 allows the device 1100 to exchange information/data with other device via a computer network, such as the Internet, and/or various telecommunication networks.

The above-described procedures and processes, such as the method 800, the method 900 and the operation process 1000 may be executed by the processing unit 11001. For example, in some embodiments, the method 800, the method 900 and the operation process 1000 may be implemented as a computer software program, which is tangibly embodied on a machine readable medium, e.g. the storage unit 11008. In some embodiments, part or the entirety of the computer program may be loaded to and/or installed on the device 1100 via the ROM 11002 and/or the communication unit 11009. The computer program, when loaded to the RAM 11003 and executed by the CPU 11001, may execute one or more steps of the method 800, the method 900 and the operation process 1000 as described above.

The present disclosure may be a method, an apparatus, a system, and/or a computer program product. The computer program product may include a computer readable storage medium (or media) having computer readable program instructions thereon for causing a processor to carry out aspects of the present disclosure.

In accordance with certain embodiments, the system 100 resides within data storage equipment that performs host I/O operations on behalf of a set of host computers. That is, the data storage equipment writes host data into a storage array and reads host data from the storage array on behalf of the set of host computers.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A data recovery method, comprising:
   in response to receiving to-be-written data at a first cache module, storing metadata in the data into a first non-volatile cache of the first cache module;
   storing user data in the data into a first volatile cache of the first cache module; and
   sending the metadata and the user data to a second cache module for performing data recovery on the user data.

2. The method according to claim 1, wherein sending the metadata and the user data to the second cache module comprises:
   sending the metadata to the second cache module;
   receiving from the second cache module a message indicating whether the metadata is successfully stored or not; and
   in response to the message indicating that the metadata is successfully stored, sending the user data to the second cache module.

3. The method according to claim 1, wherein storing the user data into the first volatile cache comprises:
   determining whether an allocated cache page for the user data is present in the first cache module or not;
   in response to determining that the allocated cache page is absent from the first cache module, allocating a volatile cache page in the first volatile cache; and
   storing the user data into the allocated volatile cache page.

4. The method according to claim 3, further comprising:
   sending to the second cache module a message indicating that the allocated cache page for the user data is absent from the first cache module.

5. The method according to claim 1, wherein storing the user data into the first volatile cache comprises:
 determining whether an allocated cache page for the user data is present in the first cache module or not;
 in response to determining that the allocated cache page is present in the first cache module, determining whether the allocated cache page is a clean page or not; and
 in response to determining the allocated cache page is the clean page, storing the user data into the allocated cache page.

6. The method according to claim 1, wherein storing user data in the first volatile cache comprises:
 determining whether an allocated cache page for the user data is present in the first cache module or not;
 in response to determining that the allocated cache page is present in the first cache module, determining whether the allocated cache page is a clean page or not;
 in response to determining that the allocated cache page is not the clean page, determining whether the allocated cache page is in the first volatile cache or not;
 in response to determining that the allocated cache page is present in the first volatile cache, establishing a virtual volatile cache page in the first volatile cache; and
 storing the user data into the allocated cache page via the virtual volatile cache page.

7. The method according to claim 1, wherein storing user data in the first volatile cache comprises:
 determining whether an allocated cache page for the user data is present in the first cache module or not;
 in response to determining that the allocated cache page is present in the first cache module, determining whether the allocated cache page is a clean page or not;
 in response to determining that the allocated cache page is not the clean page, determining whether the allocated cache page is in the first volatile cache or not;
 in response to determining that the allocated cache page is absent from the first volatile cache, allocating a volatile cache page in the first volatile cache; and
 storing the user data in the allocated volatile cache page.

8. The method according to claim 7, further comprising:
 sending to the second cache module a message indicating that the allocated cache page is absent from the first volatile cache.

9. The method according to claim 7, further comprising:
 in response to determining that the allocated cache page is absent from the first volatile cache, invalidating the allocated cache page.

10. The method according to claim 1, further comprising:
 receiving from the second cache module a message indicating whether the user data is successfully stored or not.

11. The method according to claim 1, further comprising:
 in response to the user data being lost, receiving from the second cache module the metadata and the user data that are stored in a second non-volatile cache of the second cache module; and
 recovering the lost user data from the second non-volatile cache using the metadata and the user data.

12. The method according to claim 1, further comprising:
 in response to the second cache module being unavailable, storing the user data into the first non-volatile cache.

13. The method according to claim 1, wherein storing the metadata in the data into the first non-volatile cache includes:
 storing the metadata only in the first non-volatile cache of the first cache module and not in the first volatile cache of the first cache module; and
 wherein storing the user data in the data into the first volatile cache includes:
 storing the metadata only in the first volatile cache of the first cache module and not in the first non-volatile cache of the first cache module.

14. A data recovery method, comprising:
 at a second cache module, receiving metadata and user data in data from a first cache module;
 storing the metadata and the user data into a second non-volatile cache of the second cache module;
 receiving from the first cache module a message indicating that an allocated cache page for the user data is absent from the first cache module; and
 one of:
 (i) in response to receiving the message, allocating a non-volatile cache page in the second non-volatile cache, the metadata and the user data being stored into the allocated non-volatile cache page, and
 (ii) in response to receiving the message, invalidating a volatile cache page in the second volatile cache that corresponds to the allocated cache page.

15. The method according to claim 14, wherein storing the metadata and the user data into the second non-volatile cache comprises:
 storing the metadata into the second non-volatile cache;
 sending to the first cache module an indication that the metadata is successfully stored; and
 in response to receiving the user data from the first cache module, storing the user data into the second non-volatile cache.

16. The method according to claim 14, further comprising:
 sending to the first cache module an indication that the user data is successfully stored.

17. A data recovery system, comprising:
 a first cache module;
 a second cache module; and
 at least one processing unit, configured to:
 in response to receiving to-be-written data at the first cache module, store metadata in the data into a first non-volatile cache of the first cache module,
 store user data in the data into a first volatile cache of the first cache module, and
 send the metadata and the user data to the second cache module for performing data recovery on the user data.

18. The data recovery system according to claim 17, wherein sending the metadata and the user data to the second cache module comprises:
 sending the metadata to the second cache module;
 receiving from the second cache module a message indicating whether the metadata are successfully stored or not; and
 in response to the message indicating that the metadata is successfully stored, sending the user data to the second cache module.

19. The data recovery system according to claim 17, wherein storing the user data into the first volatile cache comprises:
 determining whether an allocated cache page for the user data is present in the first cache module or not;
 in response to determining that the allocated cache page is absent from the first cache module, allocating a volatile cache page in the first volatile cache; and storing the user data into the allocated volatile cache page.

20. The data recovery system according to claim 19, wherein the at least one processing unit is further configured to:
send to the second cache module a message indicating that the allocated cache page for the user data is absent from the first cache module.

21. The data recovery system according to claim 17, wherein storing the user data into the first volatile cache comprises:
determining whether an allocated cache page for the user data is present in the first cache module or not;
in response to determining that the allocated cache page is present in the first cache module, determining whether the allocated cache page is a clean page or not; and
in response to determining the allocated cache page is the clean page, storing the user data into the allocated cache page.

22. The data recovery system according to claim 17, wherein storing user data in the first volatile cache comprises:
determining whether an allocated cache page for the user data is present in the first cache module or not;
in response to determining that the allocated cache page is present in the first cache module, determining whether the allocated cache page is a clean page or not;
in response to determining that the allocated cache page is not the clean page, determining whether the allocated cache page is in the first volatile cache or not;
in response to determining that the allocated cache page is present in the first volatile cache, establishing a virtual volatile cache page in the first volatile cache; and
storing the user data into the allocated cache page via the virtual volatile cache page.

23. The data recovery system according to claim 17, wherein storing user data into the first volatile cache comprises:
determining whether an allocated cache page for the user data is present in the first cache module or not;
in response to determining that the allocated cache page is present in the first cache module, determining whether the allocated cache page is a clean page or not;
in response to determining that the allocated cache page is not the clean page, determining whether the allocated cache page is in the first volatile cache or not;
in response to determining that the allocated cache page is absent from the first volatile cache, allocating a volatile cache page in the first volatile cache; and
storing the user data in the allocated volatile cache page.

24. The data recovery system according to claim 23, wherein the at least one processing unit is further configured to:
send to the second cache module a message indicating that the allocated cache page is absent from the first volatile cache.

25. The data recovery system according to claim 23, wherein the at least one processing unit is further configured to:
in response to determining that the allocated cache page is absent from the first volatile cache, invalidate the allocated cache page.

26. The data recovery system according to claim 17, wherein the at least one processing unit is further configured to:
receive from the second cache module a message indicating whether the user data is successfully stored or not.

27. The data recovery system according to claim 17, wherein the at least one processing unit is further configured to:
in response to the user data being lost, receive from the second cache module the metadata and the user data that are stored in a second non-volatile cache of the second cache module; and
recover the lost user data from the second non-volatile cache using the metadata and the user data.

28. The data recovery system according to claim 17, wherein the at least one processing unit is further configured to:
in response to the second cache module being unavailable, store the user data into the first non-volatile cache.

29. A data recovery system, comprising:
a first cache module;
a second cache module; and
at least one processing unit, configured to:
receive, at the second cache module, metadata and user data in data from a first cache module; and
store the metadata and the user data into a second non-volatile cache of the second cache module;
wherein storing the metadata and the user data into the second non-volatile cache comprises:
storing the metadata into the second non-volatile cache;
sending to the first cache module an indication that the metadata is successfully stored; and
in response to receiving the user data from the first cache module, storing the user data into the second non-volatile cache.

30. The data recovery system according to claim 29, wherein the at least one processing unit is further configured to:
receive from the first cache module a message indicating that the allocated cache page for the user data is absent from the first cache module; and
in response to receiving the message, allocate a non-volatile cache page in the second non-volatile cache, the metadata and the user data being stored into the allocated non-volatile cache page.

31. The data recovery system according to claim 29, wherein the at least one processing unit is further configured to:
receive from the first cache module a message indicating that an allocated cache page in the first cache module is absent from a first volatile cache of the first cache module; and
in response to receiving the message, invalidate a volatile cache page in the second volatile cache that corresponds to the allocated cache page.

32. The data recovery system according to claim 29, wherein the at least one processing unit is further configured to:
send to the first cache module an indication that the user data is successfully stored.

33. A computer program product having a non-transitory computer readable medium which stores a set of instructions for data recovery; the set of instructions, when carried out by computerized circuitry, causing the computerized circuitry to perform a method of:
in response to receiving to-be-written data at a first cache module, storing metadata in the data into a first non-volatile cache of the first cache module;

storing user data in the data into a first volatile cache of the first cache module; and sending the metadata and the user data to a second cache module for performing data recovery on the user data.

34. A computer program product having a non-transitory computer readable medium which stores a set of instructions for data recovery; the set of instructions, when carried out by computerized circuitry, causing the computerized circuitry to perform a method of:

at a second cache module, receiving metadata and user data in data from a first cache module; and storing the metadata and the user data into a second non-volatile cache of the second cache module;

wherein storing the metadata and the user data into the second non-volatile cache comprises:

storing the metadata into the second non-volatile cache;

sending to the first cache module an indication that the metadata is successfully stored; and in response to receiving the user data from the first cache module, storing the user data into the second non-volatile cache.

* * * * *